United States Patent [19]

Barry

[11] Patent Number: 5,450,114
[45] Date of Patent: Sep. 12, 1995

[54] ACCUMULATOR ROLLER SYNCHRONIZATION WITH IMAGE SIZE ADJUSTMENT

[75] Inventor: Raymond J. Barry, Lexington, Ky.

[73] Assignee: Lexmark International, Inc., Greenwich, Conn.

[21] Appl. No.: 189,542

[22] Filed: Jan. 31, 1994

[51] Int. Cl.⁶ .................................... G03G 15/01
[52] U.S. Cl. .................................. 347/116; 355/271; 347/232
[58] Field of Search .................. 355/271, 327, 207; 347/116, 139, 232

[56] References Cited

U.S. PATENT DOCUMENTS

| | | | |
|---|---|---|---|
| 4,723,145 | 2/1988 | Takada et al. | 355/3 TR |
| 5,175,564 | 12/1992 | Jamzadeh | 347/116 |
| 5,200,791 | 4/1993 | Dastin et al. | 355/326 |
| 5,227,815 | 7/1993 | Dastin et al. | 347/116 |
| 5,264,870 | 11/1993 | Egawa | 346/108 |
| 5,331,341 | 7/1994 | Egawa et al. | 347/232 X |

*Primary Examiner*—Joan H. Pendegrass
*Attorney, Agent, or Firm*—John A. Brady

[57] ABSTRACT

During manufacture of each printer (1) image size is corrected while close registration with the optical system (3) is assured by varying the pulses to a stepper motor driving accumulator roller (5). The length of an image printed using the optical sweep pulses to drive the stepper motor is observed and the change in frequency of stepper motor pulses is computed and entered as a factor in each printer of a control pulses system during manufacture. To assure registration with the optical system, the stepper motor is driven by each 200th optical sweep pulses and the control pulse system is reset and then supplies control pulses to the stepper motor until the next 200th optical sweep pulse.

14 Claims, 1 Drawing Sheet

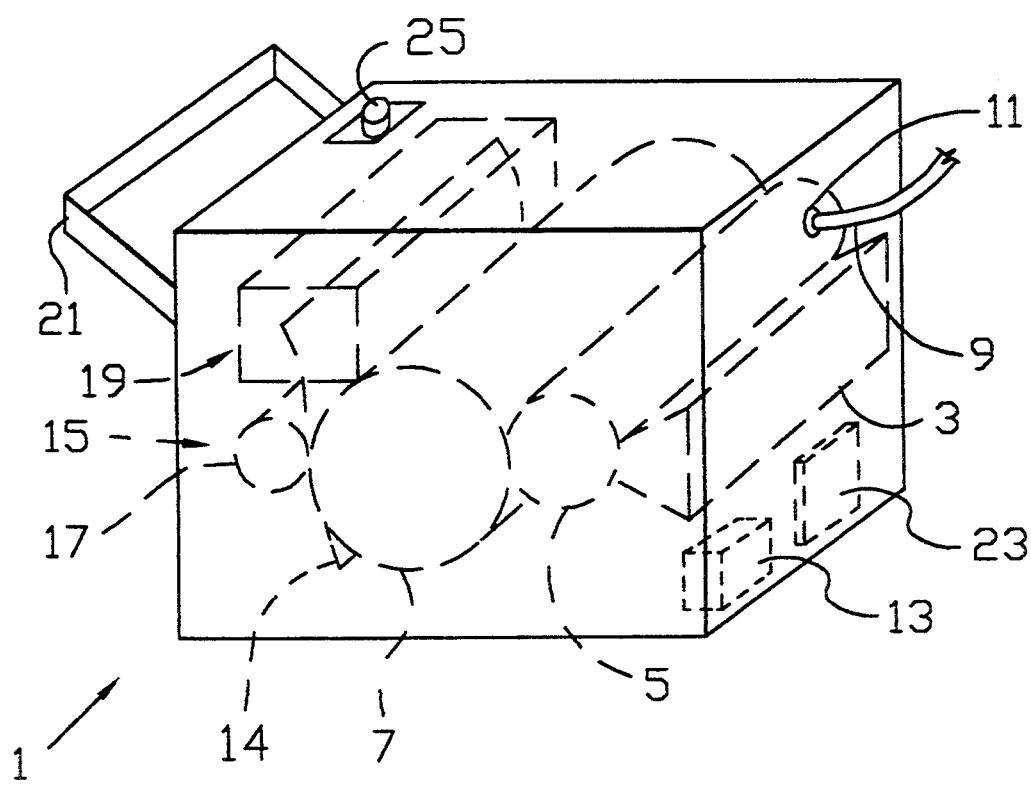

ACCUMULATOR ROLLER SYNCHRONIZATION WITH IMAGE SIZE ADJUSTMENT

TECHNICAL FIELD

This invention relates to electrophotographic or other optical imaging employing an accumulator roller or belt, typically used in multicolor imaging. The accumulator roller or belt receives multiple images from a photosensitive roller or belt in three primary colors and, at times, also black, and this final image is transferred to the final paper or other substrate. These images are applied to the accumulator member sequentially in time. To assure good registration of the multiple images, accurate synchronization is required between the accumulator member and the optical imaging system. This invention is directed to achieving such accurate synchronization, in a system in which the image size may be varied somewhat to achieve the correct or desired image size.

BACKGROUND OF THE INVENTION

Dastin et al U.S. Pat. No. 5,200,791 is illustrative in that it is directed to achieving improved registration in a multicolor imaging system. It differs basically from this invention in that during each imaging operation it employs a sensor to sense the position of the photoconductor. At column 7, beginning at line 4 it instructs away from a mechanical synchronization of the photoconductor drum and the accumulator drum.

Egawa U.S. Pat. No. 5,264,870 is illustrative since it employs a reference signal from its accumulator roller 13. Takada et al U.S. Pat. No. 4,723,145 is illustrative in that it has separate drives to its optical system and its accumulator, but does not periodically drive them from the same signal.

This invention involves the driving of the accumulator member during operation under control signals which are uniquely determined for each machine, which may be at final completion of the machine or from a control panel setting. No sensing of the position of the photosensitive member or the accumulator member is involved during operating. The timing of the operation of the optical system is sensed and employed to periodically control the drive of the accumulator member. The system of this invention can be described as a frequency locked loop with periodic phase correction to maintain a virtual phase locked system.

DISCLOSURE OF THE INVENTION

This invention is directed to an imaging apparatus having a accumulator element which is fully rotated by a stepper motor in response to control pulses and an optical system the position of which is defined by sweep pulses. The imaging apparatus has a nominal operation in which control pulses to the stepper motor directly from the sweep pulses would provide perfect synchronization and ideal image size printed. In accordance with this invention, during final manufacture of the imaging apparatus, an image is made in which the accumulator stepper motor is driven by each of the sweep pulses. The length of the image obtained is then observed to accurately determine the extent of any deviation from the ideal size in the image transferred to the accumulator element.

The number of stepper motor pulses to achieve the desired size is obtained from this observation of the image. A value is stored as a permanent factor in the printer which will control stepper motor pulses at the rate to achieve this image size. The imaging apparatus employs a presetable interval timer or clock. This presetable clock may be implemented by a high frequency clock with the imaging apparatus structured to count the clock periods up to a number corresponding to the stored factor.

The stepper motor is driven from the output of the counter during the period of a fixed number of sweep pulses. After that fixed number of sweep pulses is reached, the imaging apparatus is structured to drive the stepper motor once by the next sweep pulse and to reset the counter to zero and to then return to driving from the counter output until the number of sweep pulses again reaches the fixed number, and to then drive the stepper motor with the next sweep pulse and to continually cyclically repeat that sequence.

Since the stepper motor pulses are periodically overridden by the sweep pulses at a given fixed number, the number of control pulses to the stepper motor defined by the count need only be an integral number within the period of the fixed number. (For example, 201 control pulses in the period of 200 sweep pulses. Any fraction between 201 and 202 would be ineffective since the 200th sweep pulse will drive the stepper motor, and restart the cycle.) The period between the fixed number is selected to be sufficiently short so that any drifting from the ideal ratio between the clock-originated pulses and the imaging system pulses will not be more than one optical sweep pulse period at the time the next imaging pulse controls the stepper motor. Since the sweep pulses are part of the imaging system and define the image location on the optically sensitive member, close registration of repetitive images on the accumulator drum is assured. In the preferred embodiment a photoconductor drum is driven by gearing from the same stepper motor which drives the accumulator roller, which is not essential so long as the registration between those two elements is otherwise assured.

In an alternative embodiment, the printer has an operator control by which the operator may vary the setting of the presetable clock to vary the image in the manner described to a size desired by the operator.

BRIEF DESCRIPTION OF THE DRAWING

The details of this invention will be described in connection with the accompanying drawing which is illustrative of a printer to which this invention provides improved registration.

BEST MODE FOR CARRYING OUT THE INVENTION

In the drawing a printer 1 has a conventional laser printhead 3 which operates on a photoconductive drum 5 (termed a drum because it is a largely hollow roller). Images from drum 5 are transferred to an accumulator roller 7. Member 7 is a roller in pressing contact with the length of drum 5. Images described in electronic code or image language such as PPDS, a form of ASCII language, are received on a transmission cable 9 at printer terminal 11. Electronic data processing apparatus 13, specifically a standard microprocessor, contains interpreter software, which may also be conventional, to transform signals received into bit images which define the separate, contiguous areas of bits to be illuminated or not illuminated by laser printhead 3 as it sweeps an optical beam across drum 5.

As is conventional for color imaging, accumulator roller 7 receives in time sequence three images in three primary colors and may receive an image in black. These images must be closely registered, which registration is the subject matter of this invention. After the images are accumulated on accumulator roller 7, a transfer operation is brought into effect. Transfer stage 15 is shown illustratively with a backup roller 17, and may in practice be a conventional transfer stage. The image transferred to paper 14 is then fixed, typically by heat, at fixing station 19 and delivered to an output tray 21 for human access and use. Memory 23 is employed conventionally by data processing apparatus 13.

Conventional laser printheads are structured to provide a timing signal at the start of each sweep. The frequency of laser sweep is the frequency of occurrence of that signal. In accordance with this invention, at the time of final manufacture of printer 1, the sweep period of the laser printhead 3 is first set to adequately traverse the drum 5 to the width required. The frequency of such sweep of printhead 3 is then determined (as by direct measurement or by extrapolation from the final settings of the drive of printhead 3). That becomes a permanent factor for each printer 1, which will differ slightly for each printer 1.

Accumulator roller 7 is rotated by a stepper motor (not shown) conventionally. Printer 1 is designed so that nominally control of the accumulator stepper motor by the laser sweep pulses would result in exact registration between images on accumulator roller and subsequent images formed on photoconductor drum 5. (Specifically, subject to tolerances and slight variations in materials, at 9000 stepper motor pulses the accumulator roller will have made one revolution and the images on drum 5 will initiate on exactly the same location on the circumference of drum 5).

Small differences from the nominal cause components of printer 1 where they contact to be deformed varyingly and therefore to have slightly different effective radiuses where they press against each other. Such mechanical differences, as well as normal variations within tolerances and materials result in printer 1 not responding within nominal operation. The net result of these manufacturing differences is that the wrong image size would be produced. This is corrected in accordance with this invention by adjusting the image size without losing the inherent registration of the images of different colors.

At the time of final manufacture, a single image is printed by each printer 1 in normal matter except that the accumulator motor is driven entirely by consecutive sweep pulses. The results on paper 14 are then visually observed. The difference from nominal of the length of the image directly corresponds to the speed of accumulator roller 7. If the image is too long, roller 7 should be moved faster. If the image is too short, roller 7 should be slowed. Since each stepper motor pulse to drive roller 7 is 1/9000 of a revolution, adding one pulse adds 1/9000 of its circumference to the total movement of roller 7 and subtracting one pulse reduces roller 7 movement by 1/9000 of its circumference. For example the observations of paper 14 may show that the circumference of roller 7 moved too fast by a length which, for example, is 50/9000 of its circumference (i.e., the size error is 50/9000 of the circumference of roller 7). This is adjusted to define additional pulses to be added (or subtracted when the roller 7 is too slow) each 200 sweep pulses by dividing by 45 which results in 1 and 5/50 pulses. (This is rounded to an integer, 1 in this example, the small fraction being discarded in favor of returning to the sweep pulse periodically to avoid other variations.) In the computations to reach number of control pulses to be added or subtracted, the nominal circumference of the roller 7 is used and accurate results are realized. An alternative computation is the to use the percentage error in image size to compute a percentage change in number of motor steps for each 200 image sweeps.

Accordingly, in this example, the end result is to have 201 stepper motor pulses for each 200 laser sweep pulses. Photosensitive drum 5 is driven in close registration with accumulator roller 7, preferably from the same stepped motor which drives accumulator roller 7, through gears or belts (not shown). Since the essential operation of a stepper motor is to move the same angular amount with each pulse, each added stepper motor pulse increases the relative speed of accumulator roller 7 with respect the optical sweep pulses, which will tend to stretch the image. Conversely, each reduced stepper motor pulse reduces the relative speed of accumulator roller 7 with respect to optical sweep pulses, which will tend to shorten the images.

Preferably, the appropriate correction number based on observed size difference during the test is determined empirically by a series of experiments and stored in a table.

Printer 1 contains a high speed clock as a part of data processing apparatus 13. A number of oscillations of the high speed clock is computed to provide an output at the computed stepper motor control frequency. This constitutes a presetable clock, the clock being set by defining the number of oscillations to be counted by a counter to produce a stepper motor control signal. (Mathematically, the number is the clock frequency divided by the measured sweep frequency for the specific printer multiplied times the ratio of 200 to number of stepper motor pulses during 200 sweep pulses. This can be explained as being the nominal number corrected for the observed difference from nominal operation, which is high speed clock frequency divided by sweep frequency, modified by the difference from nominal, which is number of stepper motor pulses to be applied during 200 sweep pulses.) The number of oscillations is a comparison number. It is entered into data processing apparatus 13 as a comparison number to the counter driven by the high speed clock, so that a stepper motor pulse is produced when the count reaches that number. That count is therefore unique to printer 1 and entered during manufacture for use during the entire expected life of use of printer 1.

Printer 1 is structured to operate by passing control pulses from the counter while counting 199 of the sweep pulses from the optical system, to then pass the next sweep pulse to the stepper motor as a control pulse and also to then reset the counter defining the stepper motor control pulses, and to then repeat the sequence of operation. Each of the 200th sweep pulse is sufficiently frequent that the number of stepper motor pulses from the counter plus the next sweep pulse does not vary from the ideal by more than a fraction of the interval between sweep pulses. Periodically resetting to a sweep pulse assures that four successive images will be referenced to the sweep pulses, which define the locations of the images, and very close registration is obtained.

In the specific embodiment described the nominal laser sweep pulse frequency is 1200 Hertz. Variations in output length between plus and minus 4% are contemplated and much larger variations are possible (each addition of a control pulse to the stepper motor within the 200 sweep pluses add ½ percent to the length, each deletion subtracts ½ percent). An alternative embodiment or an additional feature to the printer as just described has an operator control 25 external to printer 1 by which a person operating printer 1 can vary the timing of the presetable clock by changing the number of the high speed oscillations to be counted, with other operation as described in the foregoing. In this way an operator can observe the current size of an image and decide on that basis if a larger or small image is desired, and then set control 25 accordingly. This is particularly useful where the printing is on preprinted forms so as to accurately place the printing within the form. Other variations in accordance with the spirit and scope of this invention can be anticipated.

What is claimed is:

1. A method of manufacturing printers having an optical sweep system providing timing pulses defining the start of optical sweep to image an endless optically sensitive element, having an endless accumulator element contiguous to said optically sensitive element, said optically sensitive element being rotated in a fixed amount and said accumulator element being rotated by a stepper motor which advances a preset amount with each control pulse applied to said stepper motor, and having means to apply a control pulse to said stepper motor from a presetable clock and to apply a control pulse to said stepper motor from said pulses from said optical sweep timing pulses only at each one of a predetermined number of said optical sweep timing pulses and to then reset said presetable clock comprising operating said printer during manufacture with said stepper motor being operated by pulses of a predetermined duration, observing the image size of at least one image printed by said operation of each of said printers with pulses of a predetermined duration, computing the period of said presetable clock to correct said image size to a predetermined size, and entering said period in said printer to set said presetable clock.

2. The method as in claim 1 in which the period of said optical sweep pulses is first adjusted to assure desired image width, thereby defining the frequency of said timing pulses in each printer being manufactured.

3. The method as in claim 2 in which the frequency of said optical sweep pulses is first adjusted and said period of said presetable clock is then determined based on said adjusted frequency of said optical sweep pulses.

4. The method as in claim 3 in which said predetermined number of optical sweep pulses is in the order of magnitude of 200.

5. The method as in claim 1 in which said predetermined number of optical sweep pulses is in the order of magnitude of 200.

6. The method as in claim 2 in which said predetermined number of optical sweep pulses is in the order of magnitude of 200.

7. The method as in claim 6 in which said presetable clock is a counter driven by a high speed clock with said control pulses applied by said presetable clock being the output of said counter at a presetable count by said counter and said computing of the period of said presetable clock computes a count to which said presetable count is set.

8. The method as in claim 1 in which said presetable clock is a counter driven by a high speed clock with said control pulses applied by said presetable clock being the output of said counter at a presetable count by said counter and said computing of the period of said presetable clock computes a count to which said presetable count is set.

9. The method as in claim 2 in which said presetable clock is a counter driven by a high speed clock with said control pulses applied by said presetable clock being the output of said counter at a presetable count by said counter and said computing of the period of said presetable clock computes a count to which said presetable count is set.

10. The method as in claim 3 in which said presetable clock is a counter driven by a high speed clock with said control pulses applied by said presetable clock being the output of said counter at a presetable count by said counter and said computing of the period of said presetable clock computes a count to which said presetable count is set.

11. The method as in claim 4 in which said presetable clock is a counter driven by a high speed clock with said control pulses applied by said presetable clock being the output of said counter at a presetable count by said counter and said computing of the period of said presetable clock computes a count to which said presetable count is set.

12. The method as in claim 5 in which said presetable clock is a counter driven by a high speed clock with said control pulses applied by said presetable clock being the output of said counter at a presetable count by said counter and said computing of the period of said presetable clock computes a count to which said presetable count is set.

13. A method of controlling the image size of a printer, said printer having an optical sweep system providing timing pulses defining the start of optical sweep to image an endless optically sensitive element, having an endless accumulator element contiguous to said optically sensitive element, said optically sensitive element being rotated in a fixed amount and said accumulator element being rotated by a stepper motor which advances a preset amount with each control pulse applied to said stepper motor, having means to apply a control pulse to said stepper motor from a presetable clock and to apply a control pulse to said stepper motor from said pulses from said optical sweep timing pulses only at each one of a predetermined number of said optical sweep timing pulses and to then reset said presetable clock, and having an operator control to set said presetable clock, comprising operating said printer with said stepper motor being operated by pulses of a first duration, an operator of said printer observing the image size of at least one image printed by said operation of said printer, and an operator of said printer changing said image size based on the image size observed by changing said control to set said presetable clock.

14. The method as in claim 13 in which said predetermined number of optical sweep pulses is in the order of magnitude of 200.

* * * * *